United States Patent [19]
Fletcher et al.

[11] 3,875,404

[45] Apr. 1, 1975

[54] WIDE ANGLE SUN SENSOR

[76] Inventors: James C. Fletcher, Administrator of the National Aeronautics and Space Administration with respect to an invention of; Larry L. Schumacher, Newhall, Calif.

[22] Filed: Dec. 28, 1973

[21] Appl. No.: 429,437

[52] U.S. Cl............... 250/211 R, 250/203, 247/171
[51] Int. Cl............................................. H01j 35/12
[58] Field of Search........ 250/211 R, 227, 203, 212; 244/171; 356/147, 138, 152

[56] References Cited
UNITED STATES PATENTS

| | | | |
|---|---|---|---|
| 2,960,417 | 11/1960 | Strotner | 250/211 R |
| 3,088,037 | 4/1963 | Baum | 250/227 |
| 3,246,274 | 4/1966 | Bisso | 250/211 X |
| 3,400,276 | 9/1968 | Zinn | 250/211 R |
| 3,424,907 | 1/1969 | Fischell | 250/203 R |
| 3,448,273 | 6/1969 | Webb | 250/203 R |

*Primary Examiner*—Walter Stolwein
*Attorney, Agent, or Firm*—Monte F. Mott; Paul F. McCaul; John R. Manning

[57] ABSTRACT

A single-axis sun sensor consists of a cylinder of an insulating material on which at least one pair of detectors is deposited on a circumference of the cylinder. At any time only one-half of the cylinder is illuminated so that the total resistance of the two detectors is a constant. Due to the round surface on which the detectors are deposited, the sensor exhibits a linear wide angle of ±50° to within an accuracy of about 2%. By depositing several pairs of detectors on adjacent circumferences sufficient redundancy is realized to provide high reliability. A two-axis sensor is provided by depositing detectors on the surface of a sphere along at least two orthogonal great circles thereof.

7 Claims, 17 Drawing Figures

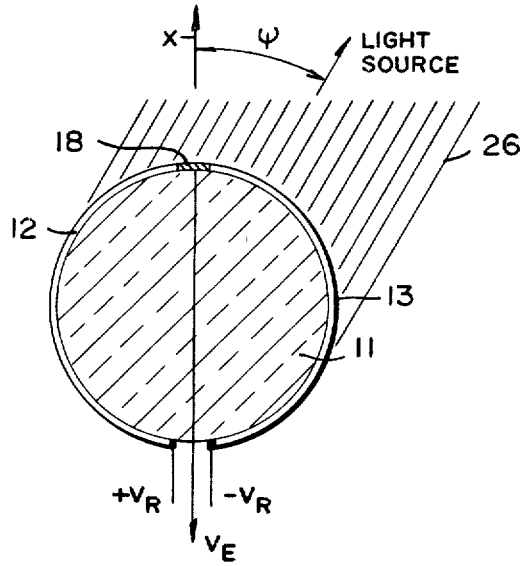
FIG. 4a
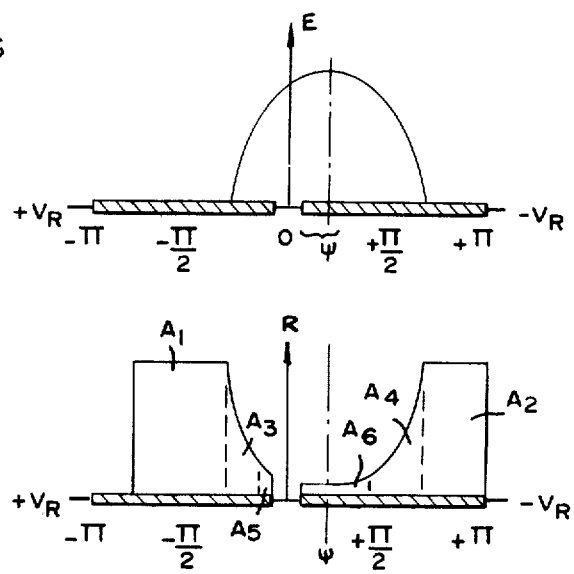
FIG. 4b
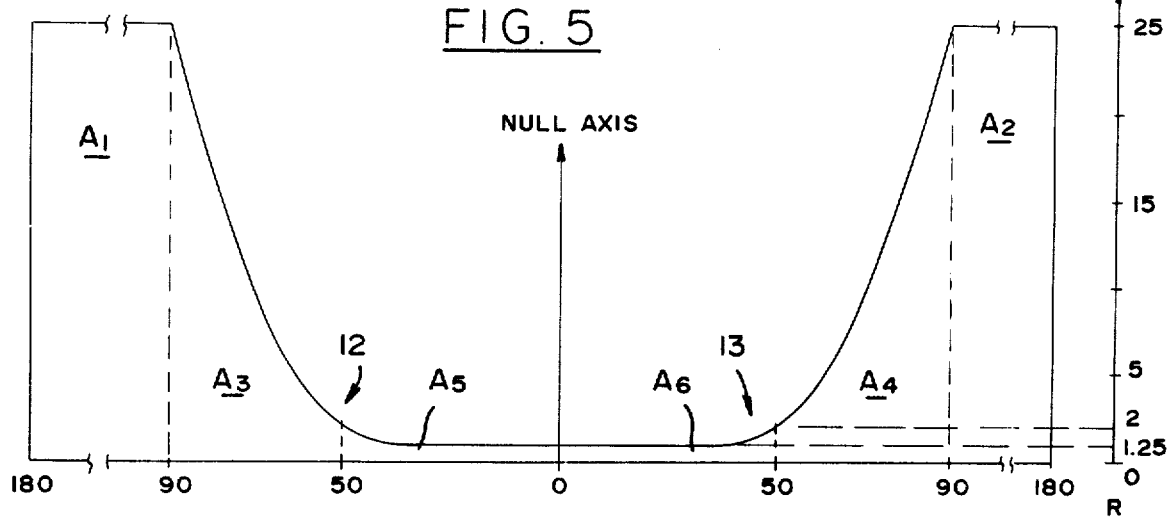
FIG. 4c
FIG. 5
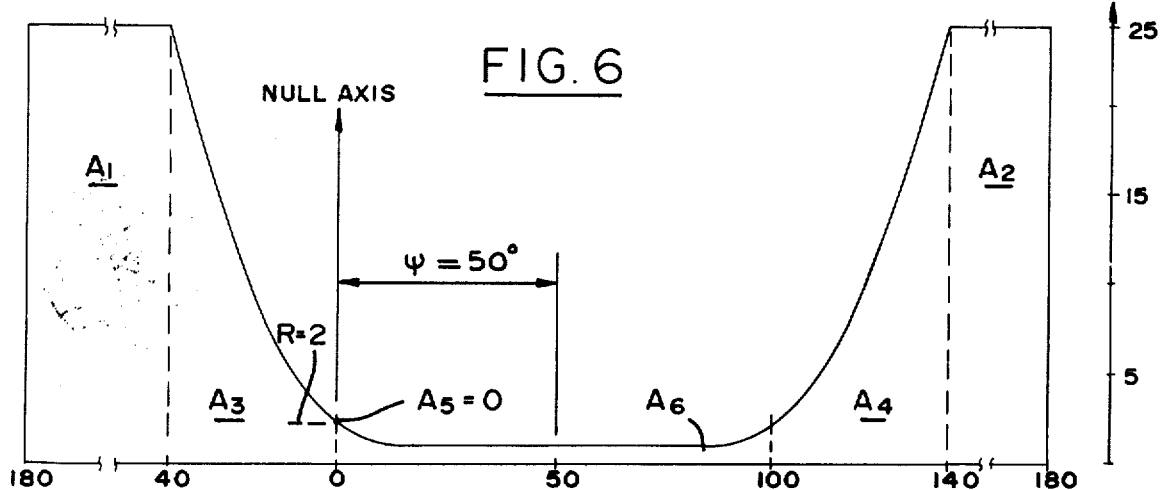
FIG. 6

WIDE ANGLE SUN SENSOR

ORIGIN OF INVENTION

The invention described herein was made in the performance of word under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to a direction sensor and, more particularly, to a wide angle radiation direction detector or sensor.

2. Description of the Prior Art

In space exploration, the sun or solar disk is used as a convenient beacon for space navigation. Space crafts often incorporate a solar or sun sensor which produces an electrical signal that is related to the angle of incidence between the sun and a reference axis on the sensor, often referred to as the null axis. In many applications, it is important that the sensor be characterized by a wide angle or field of view. That is, it is important that the sensor's electrical output signal be directly related to a large or wide angle of incidence between the sun and the sensor's null axis. Also, for long duration space exploration missions, it is important that the sensor incorporate sufficient redundancy to insure high reliability.

Present day sensors have limited fields of view, on the order of only several degrees about each control axis. Also, these sensors are subject to cross-axis coupling. Some present day sensors require shadow bars, imaginary lenses or slits, associated with pairs of detectors, to produce the appropriate output signal for each control axis. Also, current designs of sensors cannot readily be made redundant within the same device to provide the desired high reliability.

OBJECTS AND SUMMARY OF THE INVENTION

It is a primary object of the present invention to provide a wide angle sun sensor.

Another object of the invention is to provide a highly reliable yet relatively simple sun sensor.

A further object of the present invention is to provide a wide angle sun sensor with sufficient redundancy to insure high reliability.

These and other objects of the present invention are achieved by depositing pairs of detectors formed of photosensitive material, e.g., cadmium sulphide, on round support surfaces. One example of such a surface is the outer surface of a cylinder which can be used to form a single axis sensor. A pair of detectors are deposited on the circumference of the cylinder. As will be pointed out hereinafter, such a sensor exhibits wide angle characteristics and in addition it may include sufficient redundancy of the detectors to provide the desired high reliability. Two such cylinders may be used to form a twoaxis sensor. Such a sensor may also be produced by depositing two pairs of detectors on the surface of a sphere, with each pair of detectors being disposed on a great circle of the sphere.

The novel features of the invention are set forth with particularity in the appended claims. The invention will best be understood from the following description when read in conjunction with the accompanying drawings.

BRIEF DESCRIPTION OF THE DRAWINGS

FIGS. 4a, 4b and 4c are similar to FIGS. 3a, 3b and 3c, respectively for $\Psi \neq 0$;

FIGS. 5 and 6 are useful in explaining the wide angle properties of the sensor of the present invention;

DESCRIPTION OF THE PREFERRED EMBODIMENTS

Figure 1:
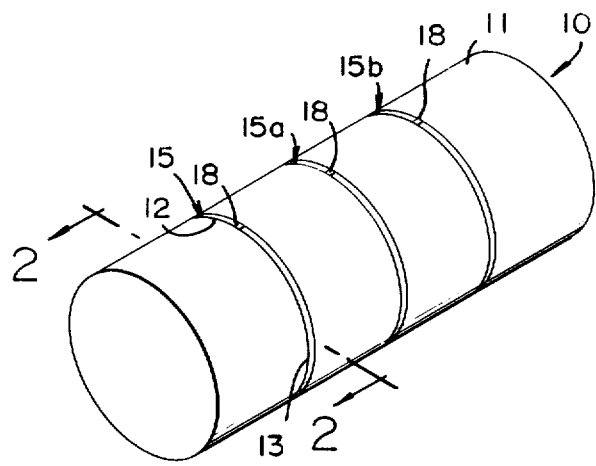
FIG. 1 is an isometric view of a cylindrical single axis sun sensor.

Attention is first directed to FIG. 1 wherein a single-axis sensor 10 is shown consisting of a cylinder 11 which is of an electrically insulating material. A pair of detectors 12 and 13 are deposited as a circumference of cylinder 11. The pair of detectors is designated by numeral 15. Sufficient redundancy is provided by depositing several additional pairs of detectors on adjacent circumferences. Two additional pairs are designated by 15a and 15b. The additional pairs are identical with pair 15 and their detectors are also designated by numerals 12 and 13. Since in operation only one pair is used, hereinafter only pair 15 will be described in detail. The detectors are typically of photosensitive material, e.g., cadmium sulphide whose resistance decreases as a function of the intensity of the light directed thereto.

Figure 2:
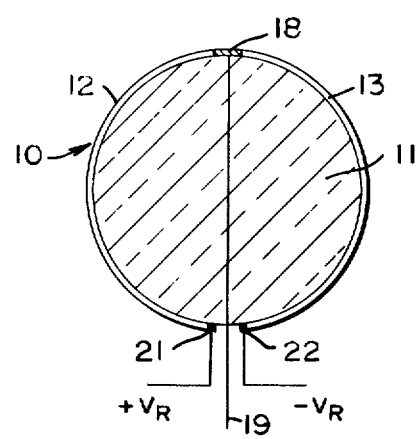
FIG. 2 is a cross-sectional view along line 2—2 of FIG. 1.

Ohmic contacts are made to the detectors 12 and 13 as in the prior art by deposited metalization at each end of each detector. Since a pair of adjacent ends of the detectors are usually jointed together electrically to make a common contact, metalization at point 18 may be employed for this purpose to form a common terminal 18. As shown in FIG. 2 which is a cross-sectional view along lines 2—2 of FIG. 1, a wire lead 19 passes from terminal 18 through cylinder 11 for connection to the electronics of the sensor. Metalizations 21 and 22 at the other ends of detectors 12 and 13, respectively, form end terminals which are connected to the positive and negative terminals of a battery at $+V_R$ and $-V_R$ volts. The electronics is shown schematically in FIG. 2a. Therein, numeral 25 designates an amplifier whose input is connected to line 19 and whose output is designated $V_E$. The null axis X of the detector is assumed to bisect the cylinder lengthwise as shown in FIG. 3a. That is, the null axis is in a plane which bisects the cylinder lengthwise with each detector covering substantially one-half of the circumference on either side of the plane.

Figure 3B:
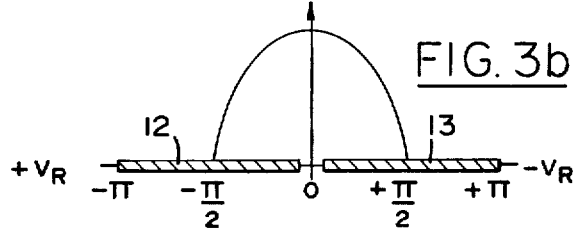
FIGS. 3a, 3b and 3c are diagrams useful in explaining the characteristics of the novel sensor when $\Psi = 0$.
Figure 3C:
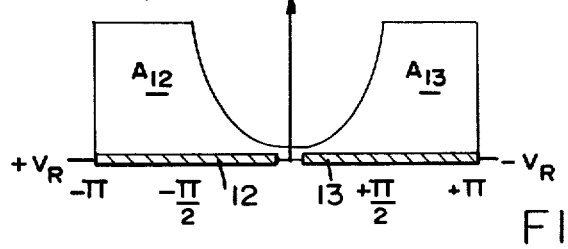

The principle of operation of the detector 10 may be explained in connection with FIGS. 3a, 3b and 3c. Solar radiation designated in FIG. 3a by 26, regardless of its direction with respect to the null axis always illuminates only one-half of the cylinder. The intensity of illumination at any point in the illuminated portion of each detector is a function of the cosine of the incident light angle ($\theta$). The light intensity over the shaded or unilluminated part of cylinder 11 is assumed to be constant, very small and therefore can be neglected. in FIG. 3b, the detectors 12 and 13 on the circumference of cylinder 11 are illustrated by straight lines and the light intensity profile is plotted as a function of the angle of incidence from the null axis for the case shown in FIG. 3a, i.e., in which the direction of the solar radiation is aligned with the null axis. FIG. 3c shows the resistance of each detector of cadmium sulphide of constant width. The actual resistance of each detector can be evaluated by integrating the resistance per unit length over the length of the detector as indicated by areas $A_{12}$ and $A_{13}$.

Defining the resistances of detectors 12 and 13 as $R_1$ and $R_2$, respectively, it should be apparent that the resistance of each detector varies as more or less of it is illuminated. Also, when the solar radiation direction coincides with the detector's null axis both detectors are equally illuminated and therefore $R_1 = R_2$. On the other hand when the solar radiation direction is off the null axis by some angle $\Psi$, $R_1 \ne R_2$. However, irrespective of $\Psi$, since at any time only one-half of the cylinder is illuminated, $R_1 + R_2$ is a constant, definable as C.

Figure 2A:
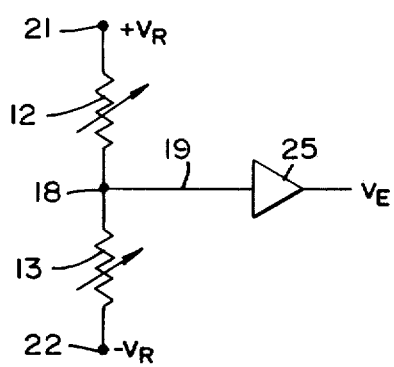
FIG. 2a is a circuit diagram including a pair of detectors.
Figure 3A:
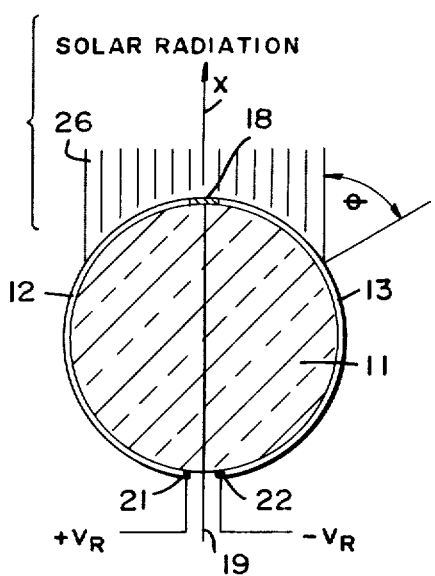

From FIG. 2a, it is seen that the sensor's error signal $V_E$ can be expressed as $$V_E = \frac{V_r}{R_1 + R_2}(R_1 - R_2) \qquad (1)$$

where $R_1$ and $R_2$ represent the respective resistances of detectors 12 and 13. Since $R_1 + R_2 = C$, the error signal can be expressed as $$V_E = \frac{V_R}{C}(R_1 - R_2) \qquad (2)$$

Since $V_R$ is the battery voltage which is fixed the error signal is directly related to the resistance unbalance $R_1 - R_2$. Hereinafter, it will be shown that due to the circular surface of the cylindrical circumference on which the detectors are deposited, the detector exhibits very wide angle characteristics, i.e., large $\Psi$. This property can best be explained in connection with FIGS. 4a–4c which are similar to FIGS. 3a–3c except that in the former figures $\Psi$ is other than zero. In FIG. 4c, the resistance $R_1$ of detector 12 is represented by the sum of areas $A_1 + A_3 + A_5$, while the resistance $R_2$ of detector 13 is represented by the sum of areas $A_2 + A_4 + A_6$. Thus, $$R_1 - R_2 = K[(A_1 + A_3 + A_5) - (A_2 + A_4 + A_6)] \qquad (3)$$

where K is proportionately constant.

Area $A_3$ is made equal to Area $A_4$. Therefore, $$R_1 - R_2 = K[(A_1 - A_2) + (A_5 - A_6)] \qquad (4)$$

and $V_E = \frac{V_R}{C} K[(A_1 - A_2) + (A_5 - A_6)]. \qquad (5)$

Generally, areas $A_5$ and $A_6$ are quite small and therefore their difference is very small and can be neglected. Consequently, equation (5) can be rewritten as $$V_E \cong \frac{V_R}{C} K[A_1 - A_2] \qquad (6)$$

From FIG. 4c, it is apparent that the difference $A_1 - A_2$ is directly related to $\Psi$. Each of areas $A_1$ and $A_2$ represents the unilluminated portion of the detector whereat the resistance is a maximum and constant. As the angle $\Psi$ increases the difference increases. $A_1 = A_2$ and therefore the difference is zero when $\Psi = 0$. Thus, the difference can be expressed as $$A_1 - A_2 = C_1 \Psi \qquad (7)$$

where $C_1$ is proportionately constant, and equation (6) can be rewritten as $$V_E = \frac{V_R}{C} K(C_1 \psi) \qquad (8)$$

It is thus seen that since $V_R$, C, K and $C_1$ are constant $V_E$ is directly related to $\Psi$. In one calculation based on the actual measured resistance of a fully illuminated sintered cadmium sulphide (CdS) detection as a function of the incident angle of a 6,000 foot candle light source, the error was calculated to be about 2% with $\Psi = 50°$. FIG. 5 to which reference is made is a graph of the actual measured resistances of the illuminated sintered cadmium detectors 12 and 13 with $\Psi = 0$.

When $\Psi = 50°$, the resistances of the two detectors 12 and 13 are as shown in FIG. 6. $A_5$ is practically zero and therefore $R_1 = K [A_1 + A_3]$, while $R_2 = K [A_2 + A_4 + A_6]$. Since $A_3 = A_4$, therefore $$R_1 - R_2 = K [A_1 - A_2 - A_6]. \qquad (9)$$

The effect of ignoring $A_6$ may be determined by the ratio of $A_6$ to the total sum of all the areas $A_1$ through $A_6$.

| | |
|---|---|
| $A_1 = 25 \times 140$ | $= 3500$ |
| $A_2 = 25 \times 40$ | $= 1000$ |
| $A_3 \cong \dfrac{25 \times 40}{2} + 2 \times 40$ | $= 580$ |
| $A_4 \cong \dfrac{25 \times 40}{2} + 2 \times 40$ | $= 580$ |
| $A_5 = 0$ | |
| $A_6 \cong 1.25 \times 100$ | $= 125$ |
| TOTAL AREA | $5785$ |

The evaluated error is therefore $$\frac{A_6}{\text{Total Area}} = \frac{125}{5785} = 0.02$$

or less than 2% maximum, for $\Psi$ is great as 50'.

From the foregoing, it is thus seen that by depositing the detectors 12 and 13 on the circumference of the cylindrical surface of cylinder 11 the sensors exhibit a high degree of linearity over a wide angle $\Psi$ e.g., $\pm 50°$ from the null axis.

Figure 7:
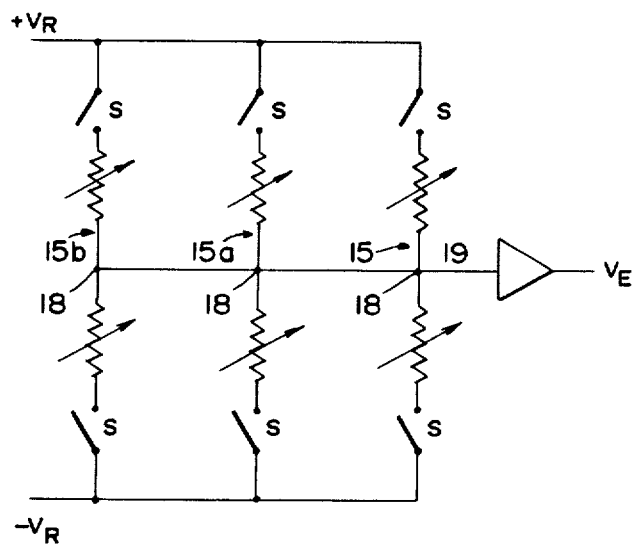
FIG. 7 is a schematic diagram of the sensor with detector redundancy.

As shown in FIG. 1, several pairs of detectors may be deposited on adjacent circumferences for redundancy purposes. As shown in FIG. 7, switches S may be incorporated between the ends 21 of detectors 12 of the various detector pairs and $+V_R$, as well as between ends 22 of detectors 13 of the various detector pairs. These switches can be used to select the particular pair of detecotrs 12 and 13 which is connected across the voltage source. It should be pointed out that the detectors 12 and 13 need not be of the same pair such as 15, 15$a$ or 15$b$. Since all the detectors 12 are on the same half of cylinder 11 (see FIG. 1) and all detectors 13 are on the other half, any detector 12 from any of the pairs and any detector 13 can be employed as the used pair. For example, detector 12 of pair 15 and detector 13 of pair 15$b$ may be used. Thus, as long as one detector 12 and one detector 13 function properly, the sensor is operable. It is thus seen that the cylindrical surface, in addition to providing the wide angle property of the sensor, is also very convenient to provide sufficient detector redundancy to insure high reliability.

Figure 8:
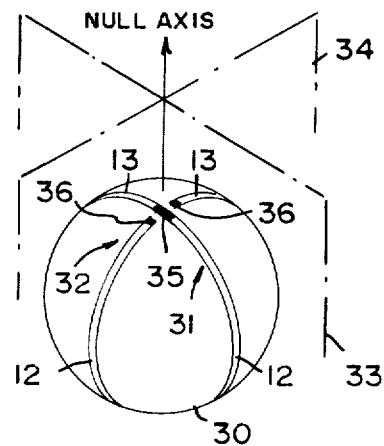
FIGS. 8–12 are diagrams useful in explaining different embodiments of a sphere shaped two-axis sensor in accordance with the present invention.

As previously pointed out and as should be apparent from the foregoing description, sensor 10, hereinbefore described is a single axis sensor. Solar radiation direction about two orthogonal axes may be sensed by using two cylinders oriented perpendicular to one another. Also, a two-axis sensor may be produced by depositing two pairs of detectors on the surface of a sphere as shown in FIG. 8. Therein, the sphere is designated by numeral 30 and the two pairs of detectors 12 and 13, as hereinbefore described. In practice, the pair 31 is deposited so that it lies on one great circle of the sphere in a plane 33 and pair 32 is on another great circle in a plane 34, which is perpendicular to plane 33, and with the null axis being in both planes.

Figure 9:
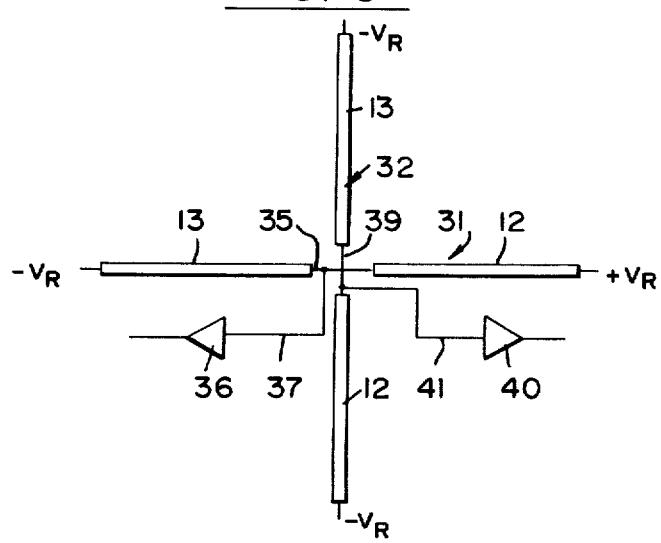

The upper ends of detectors 12 and 13 of pair 31 are interconnected by a contact 35 which is in turn connected to an amplifier 36 through a wire 37 as shown in FIG. 9. Similarly, the other ends of detectors 12 and 13 of pair 31 are respectively connected to terminals $+V_R$ and $-V_R$ of the battery source. Similarly, the upper ends of detectors 12 and 13 of pair 32 are interconnected at a terminal 39 which in turn is connected to an amplifier 40 through a wire 41. The other ends of detectors 12 and 13 are respectively connected to $+V_R$ and $-V_R$, Terminals 35 and 39 are analogous to terminal 18 in FIG. 2, wires 37 and 41 perform the function of wire 19, and amplifiers 36 and 40 perform the function of amplifier 25.

Figure 10:
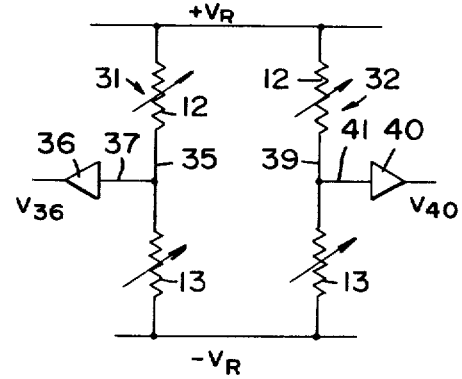

This arrangement is diagrammed schematically in FIG. 10, wherein the detectors are represented as variable resistors, and the outputs of amplifiers 36 and 40 are designated by $V_{36}$ and $V_{40}$, respectively, From the foregoing, it should be apparent that the output $V_{36}$ is directly related to the angle $\Psi$ between the direction of solar energy and plane 34, while $V_{40}$ is directly related to the angle between the solar energy direction and plane 33. Thus, the sensor in FIG. 8 is a two-axis sensor. Since each of its pairs of detectors is deposited on a circular surface or great circle of sphere 30, it exhibits the same wide angle property as the cylindrical sensor 10, hereinbefore described.

Figure 11:
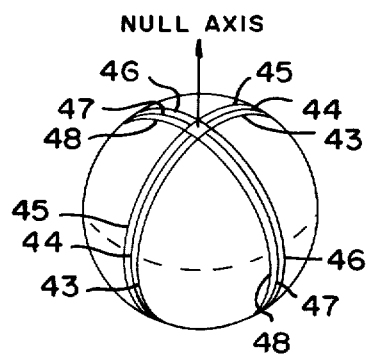

If desired, detector redundancy may be deposited on the sphere by depositing several adjacent pairs of detectors about each axis, as shown in FIG. 11, Therein numerals 43, 44 and 45 represent three adjacent pairs of detectors for one axis and numerals 46, 47 and 48 represent three adjacent pairs of detectors for the other orthogonal axis. It should be pointed out however, that in operation only one pair of detectors is employed for each axis.

Figure 12:
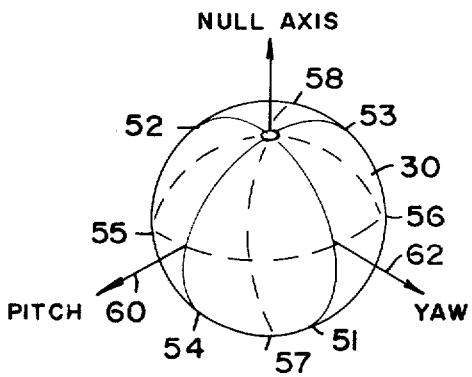

Another redundancy method utilizes all longitudinal detectors, such as cadmium sulphides, deposited on great circles of sphere 30 as shown in FIG. 12. The detectors are designated by numerals 51–58. In this case opposing detector pairs on the same great circle of the sphere are only used in the planes orthogonal to the control axes. Detector redundancy is provided by selecting the appropriate pair of detectors from the off axis great circles. For example in FIG. 12, detectors 51 and 52 provide the principal error detection about the pitch axis 60 and detectors 53 and 54 provide the principal error detection about the yaw axis 62. Redundancy in the pitch axis can be accomplished by selecting detector pairs 55 and 57 or 58 and 56. Redundancy about the yaw axis can be accomplished by selecting pairs 56 and 57, or 55 and 58. In this scheme the allowable error angle though quite large is less than 50 degrees and the scale factor is reduced by the cosine of angle between the plane containing principal detectors and a plane containing one of the redundant detectors.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A single-axis sun sensor comprising:
   a cylindrically shaped electrically insulating support member;
   at least a first pair of photosensitive detectors supported on the outer surface of said member on opposite sides thereof, with respect to an imaginary plane bisecting said member into two equal parts along its length and extending through the member's longitudinal axis, each detector having first and second opposite ends;
   first means for connecting said first ends of said detectors to form a first terminal;
   second means including a D.C. potential source having first and second source terminals at $+V_R$ and $-V_R$ volts respectively, with respect to a D.C. reference potential;
   said first pair of detectors comprising first and second detectors which are strip-shaped of equal lengths between their ends and of constant width in a direction parallel to said longitudinal axis and are deposited on said outer surface in a circular pattern in a plane perpendicular to the member's longitudinal axis, each detector substantially defining a semicircle on either side of said imaginary plane and said second means further coupling the second ends of said first and second detectors to said first and second source terminals respectively, whereby the amplitude of the D.C. potential at said first terminal is a function of the angle between the direction of solar radiation and said imaginary plane and the polarity of said D.C. potential with respect to said reference D.C. potential is indicative of radiation direction with respect to said imaginary plane.

2. The sun sensor as described in claim 1 further including at least a second pair of said detectors deposited on the outer surface of said member spaced apart from said first pair and similarly coupled to said source terminals.

3. A single-axis radiation direction sensor comprising:
- a cylindrically shaped electrically insulating support member;
- a first pair of radiation-sensitive detectors, comprising first and second detectors supported on substantially a circumference of said cylinder, each detector having first and second ends, with the first ends of the two detectors adjacent one another at about a first point on said support member and the second ends of the two detectors adjacent one another at about a second point on said surface, diametrically opposite said first point, whereby each detector covers substantially a different half of said circumference, with said first and second points being aligned in an imaginary plane defining a null plane bisecting said cylinder into two halves;
- first means for connecting the detectors' first ends to form a first terminal;
- a D.C. potential source having first and second source terminals at D.C. voltages of $+V_R$ and $-V_R$ respectively with respect to a D.C. reference potential;
- second means for selectively coupling said second ends of said first and second detectors to said first and second source terminals respectively, whereby the amplitude of the D.C. potential at said first terminal with respect to said reference potential is a function of the angle between radiation direction and said null plane and the polarity is a function of the radiation direction with respect to said null plane; and
- a second pair of radiation-sensitive detectors comprising first and second detectors supported on said support member on a circumference spaced from the circumference at which said first pair is deposited, with the first and second points at about which the first and second ends of the second-pair detectors are positioned being in said null plane, with the first detectors of said pairs being on one side of said plane and the second detectors being on the other side of said plane, said second means selectively connecting the second end of one of said first detectors to said first source terminal and the second end of one of said second detectors to said second source terminal.

4. The sensor as described in claim 3 wherein said radiation is solar radiation and each of said detectors is a photosensitive detector.

5. The sensor as described in claim 4 wherein each photosensitive detector is a strip of cadmium sulfide deposited on said support member.

6. A sun sensor comprising:
- a support member having a sphere-shaped electrically insulating outer surface;
- a first pair of photosensitive detectors disposed on said sphere on a first great circle thereof, each detector having first and second ends and being strip-shaped of equal length and width and extending along substantially one-half of said first great circle;
- means for connecting the first ends of the detectors of said first pair to form a first common terminal;
- a second pair of photosensitive detectors disposed on said sphere on a second great circle thereof, each detector of said second pair having first and second ends and being strip-shaped of equal length and width and extending along substantially one-half of said second great circle, the two great circles being perpendicular to one another;
- means for connecting the first ends of the detectors of said second pair to form a second common terminal;
- a D.C. potential source having first and second source terminals at $+V_R$ and $-V_R$ volts with respect to a D.C. reference potential; and
- means for connecting the second end of one detector of each pair to said first source terminal and the second end of the other detector of each pair to the second source terminal, whereby the D.C. potential and polarity at said first common terminal are indicative of the direction of sunlight with respect to a first plane including said first great circle and the angle therebetween and the D.C. potential and polarity at said second common terminal are indicative of the direction of sunlight with respect to a second plane including said second great circle and the angle therebetween.

7. The sun sensor as described in claim 6 wherein said first and second terminals lie in a common imaginary straight line extending through the center of said sphere.

* * * * *